United States Patent Office 3,558,598
Patented Jan. 26, 1971

3,558,598
METHOD FOR IMPROVING CITRUS OIL RECOVERY
Donald E. Epperson, Diamond Bar, and Peter L. Douglas, Glendora, Calif., and Ronald B. McKinnis, Winterhaven, Fla., assignors to Automatic Machinery & Electronics, Inc., Covina, Calif., a corporation of California
No Drawing. Continuation-in-part of application Ser. No. 714,331, Mar. 19, 1968. This application June 10, 1968, Ser. No. 735,528
Int. Cl. C09f 11/00
U.S. Cl. 260—236.6                                     11 Claims

ABSTRACT OF THE DISCLOSURE

This is a continuation-in-part application of Ser. No. 714,331, filed Mar. 19, 1968, now abandoned, the disclosure of which is incorporated herein by reference.

In the process of recovering citrus peel oil wherein the oil is expressed from the peel of the fruit and captured in water to provide a dilute mixture or emulsion containing the oil, the dilute or emulsion fed to a desludging operation which removes most of the insoluble solids and concentrates the oil emulsion into a cream, the cream then being fed to a polishing operation to break the emulsion and produce a clear citrus peel oil; the improvement wherein the cream from the desludging operation is thinned by being forced through an orifice or subjected to violent agitation prior to introduction into the polisher, to thereby improve the separation of the oil from the cream in the polishing step.

BACKGROUND OF THE INVENTION

The citrus peel oil industry has been long confronted with the problem of recovering the citrus peel oil in pure form from the thick emulsion which is produced by the desludger. Normally, the cream produced by the desludger is polished in a polishing operation that separates the citrus peel oil from the emulsion. However, the thick cream or emulsion produced by the desludging operation is difficult to completely separate in the polisher. When emulsion is thick much of the oil is lost into waste discharge from the polishing operation. Accordingly, there has been a long felt need for an improved method of treating the citrus peel oil cream from the desludger in order to improve the oil recovery in the polisher and reduce the amount of citrus peel oil which is wasted as a result of escaping into the polisher discharge. The present invention overcomes these problems and is based upon the discovery that by thinning the emulsion from the desludging operation prior to polishing, the polisher separates the oil from the cream more efficiently and that less of the valuable citrus peel oil is wasted through loss in the discharge from the polisher.

SUMMARY OF THE INVENTION

Briefly, the present invention comprises in the process of recovering citrus peel oil wherein the oil is expressed from the peel of the fruit and captured in water to provide a dilute mixture or emulsion containing the oil, the dilute mixture or emulsion fed to a desludging operation which removes most of the insoluble solids and concentrates the oil emulsion into a cream, the cream then being fed to a polishing operation to break the emulsion and produce a clear citrus peel oil; the improvement wherein the cream from the desludging operation is thinned prior to introduction into the polisher to thereby improve the recovery of the oil from the cream in the polishing step.

In the preferred embodiment of our invention, the temperature of the water used throughout the process is maintained within the range from about ambient (70° F.) to about 180° F., and preferably from about 120° F. to 150° F.

It is an object of the present invention to provide an improved method for the recovery of citrus peel oil.

More particularly, it is an object of the present invention to provide an improved method for the breaking of the cream emulsion from the desludging operation and to minimize the loss of valuable citrus peel oil.

It is a further object of the present invention to increase the efficiency of the polishing operation in a citrus peel oil recovery process.

These and other objects and advantages of the present invention will be apparent from the more detailed description which follows.

In the commercial production of citrus peel oils, the following operational steps are commonly employed:

(1) The oil in the peel of the citrus fruit is removed by mechanical means, using water as a carrier. Efficient removal of the oil from the peel, even with a gentle mechanical action, produces pectin and other soluble and insoluble materials along with the oil and the water.

(2) A centrifugal separator known as a sludger is then used to remove most of the insoluble materials and water, along with the soluble materials. The peel oil has the lowest specific gravity and some of it can be recovered directly from the sludger in fairly clean condition. Efficient recovery demands that more oil be removed in the light phase stream from the sludger, and this additional oil is accompanied by protective colloids and water. The oil-containing stream is an emulsion of oil and water, with protective colloids, and resembles cream.

(3) A centrifugal separator known as a polisher is then used to separate oil and other materials from the cream, to produce clean peel oil. The feed rate is low, and accordingly, residence time for separation is quite long. Some peel oil is readily separated, but the loss of oil in the waste discharge of sludge and water is substantial.

In accordance with this invention, it has been found that most of the peel oil which would otherwise be lost in the waste from the polisher can be recovered if the cream from the sludger is suitably treated before going to the polisher. The treatment involves thinning of the cream. The untreated cream may be quite viscous and it contains many small clumps, which in time may agglomerate and separate, or gel. After the thinning treatment, the cream is very much less viscous, very smooth and has no readily apparent clumps. The difference is further illustrated by treatment of the thinned cream in a De Laval 10 ML tube centrifuge. Water separation decreases, oil separation increases more than the water decreases, and a middle layer or sludge is less colored with oil, or is colorless.

The emulsion liquids are oil and water. The protective colloids are pectin and dehydrated solid particles. There may be cation pectates, protopectin, hemi-cellulose, suberin-like material from the outer layer of the flavedo. Possibly all of these materials act as protective colloids for the suspension of oil drops in water, but they can agglomerate or cream-off with oil included. Of the solid particles, only the suberin-like material could have any affinity for oil, but this material is not likely to be in an amount comparable to the pectate materials. A small amount of protein is available for inclusion and this material may be partially hydrophilic. It is apparent that almost all, if not all, of the protective colloids are hydrophilic. This means that usually the emulsion must be of the oil in water type. Attempts to make a water and oil emulsion by adding extra oil, even with a wetting agent, have failed. The thinning of the cream by violent agitation may be carried out in a variety of ways employing different equipment, and accordingly the discussion of specific apparatus for accomplishing this thinning as set forth herein is intended merely to be illustrative and is not limiting since those skilled in the art based upon the discussion contained herein will be able to select other types of devices which are equally suitable for the practice of the present invention.

Essentially any high speed mechanical agitator or mixing devices are applicable to the present invention. Typically such devices have flat rotating blades which may number from 1 to 12 and rotate at speeds from 1000 or more revolutions per minute up to 20,000 or more revolutions a minute.

In one manner, the thinning of the cream may be carried out in a one quart stainless steel Waring blender, as described in the following example I which is presented solely to illustrate the invention and should not be regarded as limiting in any way.

EXAMPLE I

A one quart stainless steel Waring blender is used to thin the emulsion. This modified Waring blender was placed under the emulsion discharge from the desludging operation to allow the emulsion to flow into the blender. Two holes were drilled to allow for the varying feed rates from the desludging operation to the blender. Over each hole a ¼ inch stainless steel tubing was placed. The tubing was ¾ inch long and it was soldered to permit rubber tubing connections between the desludger and the blender. For discharge of the emulsion from the blender, two ¼ inch holes were drilled into the side of the container, one hole was drilled 1⅞ inches from the bottom of the container and the other 2⅞ inches from the bottom. A piece of rubber tubing was connected to each of the ¼ inch discharges and the ends of the rubber tubing placed in the inlet side of the pump that pumps the emulsion to the polisher. The rate of emulsion being fed from the separator to the blender was 160.7 lbs. of emulsion per hour. At this rate of feed, both of the ¼ inch discharges from the blender were discharging at the same rate the blender was being fed. The speed of the blender without a load was about 18,000 r.p.m. Upon passing a substantial amount of the cream emulsion through the blender it was found that the efficiency of oil separation was about 89.1%. The efficiency of the polisher before placing the blender in the system was about 75.1%.

Fundamental to this invention is that the thick cream produced in the desludging operation, which normally has a viscosity of 500 to about 20,000 centipoise, commonly about 2000 to 4000 centipoise, as measured by Brookfield No. 2 spindle at 30 r.p.m., be thinned to a viscosity generally on the order of about 10 centipoise. The time required to effect the thinning by the violent agitation varies with the particular equipment employed for this purpose. However, for a Waring blender of the type described above the thinning occurs almost instantly, that is, in less than about 12 seconds.

Treatment in a quart or gallon size Waring blender allows almost complete recovery of oil from the cream. 250 ml. blended at 0.5 minute at full speed in the quart size is used as a standard control treatment, with final centrifugal separation in a 10 ml. tube De Laval gyrotester. Both quart and gallon size blenders have been used to treat the cream being fed to a polisher, with results which confirm the efficacy of the treatment for commercial operation.

EXAMPLE II

Low pressure homogenization produces equivalent results, using 400 to 700 p.s.i. pressure. Good results have been obtained with a small homogenizer valve, or a blunt-point needle valve, or a ball poppet valve. A wide-angle needle valve, with spring return against pressure, has also given good results. All of these provide high velocity flow through a thin annular area, with high shear, and a sudden complete reduction of pressure, together with impingement on the interior wall of the valve.

Treatment of the cream emulsion in either of the manners described above, at low intensity or short time, reduces viscosity, but does not allow separation of the amount of oil that could be expected from the reduction of viscosity, alone. Further treatment may not reduce the viscosity any further, but does result in recovery of a greater amount of oil. The clumps, mentioned above, are of a gelatinous character and are easily disintegrated with some increase of recoverable oil. Further treatment reduces viscosity only slightly by disintegrating small particles into smaller particles, but the increase in recoverable oil is considerable. This increase may be caused by further disturbing the protective colloids and oil, or to the coalescing of oil particles to make them recoverable, or to a combination of both.

The concentration of protective colloids can be so high or concentration of oil in the cream is so low that it dominates. Treatment has little effect and oil recovery is low. The viscosity remains too high for the efficient use of centrifugal force in separating the small sizes of oil drops. The settling force is not great enough. The protective colloid protects the small drops of oil from combining or coalescing with other drops to polish out and these small particles have a higher density than oil, and usually a lower density than water. The cream originally was separated by the sludger as being less dense than either water or sludge. Some oil can be lost in the sludge discharge from the sludger, if the amount of attached oil is not enough to allow it to report along with the oil. This means that the ratio of oil to protective colloids should be high, or that the amount of protective colloids should be low, in the feed to the polisher.

We have explained why the sludge reports as a middle layer when centrifuging untreated cream in a 10 ml. tube gyro-tester. One would possibly expect it to be heavier than water, but the fact is that the sludger centrifuge has selected an oil-bearing sludge. If the cream has been treated, the water layer, which is at the bottom of the tube, decreases greatly in amount or disappears. This means that oil has been separated from the sludge, so the sludge is heavier and can settle to the bottom of the tube, trapping the water with it.

We have found that some creams of very high viscosity but low in oil content do not respond favorably to any of the mechanical treatments described above. However, we have found that addition of peel oil to the viscous cream before mechanical treatment produces a treated oil rich cream having low viscosity. Polisher efficiency on such cream is greatly increased. To explain this, it is first noted that we simply dilute a viscous material with a less viscous one. Of more importance, we believe, is that the oil is not soluble in water and that it becomes a continuous phase, so that we obtain an oil-in-water emulsion dispersed in oil. A further very important factor is that the excess of oil allows faster and more efficient coalescence of oil droplets. When two drops coalesce, the interfacial area and consequently the interfacial energy decreases.

As has been indicated the temperature of the water (and the emulsion) in the process of this invention is preferably maintained within the range from ambient up to about 180° F. It has been found that while this temperature range is not critical to the invention, optimum oil recovery and purity is had by operating within this range. Temperatures significantly above 180° F. cause the dissolution of a substantial amount of wax which forms an undesirable contaminant on the citrus oil product. Temperatures below about ambient (70° F.) result in a gradual falling off in the efficiency of the oil recovery. The most preferred temperature range is generally from about 120° F. to about 150° F.

In general, the present invention is applicable to the recovery of any citrus oil including lemon, lime, orange, tangerine, grapefruit and the like. Those skilled in the art will readily recognize that many variations are possible within the scope of the present invention. Accordingly, it is intended that the invention be limited only by the lawful scope of the appended claims.

We claim:

1. In the process of recovering citrus peel oil wherein the oil is expressed from the peel of the fruit in the presence of water to provide a dilute emulsion containing said oil, the dilute emulsion is fed to a desludging operation which removes most of the insoluble solids and concentrates said oil emulsion into a cream, and the cream is then fed to a polishing operation to break the cream emulsion and separate the citrus peel oil from said cream to produce a clear citrus peel oil; the improvement comprising mechanically thinning said cream to reduce the viscosity thereof prior to subjecting the same to said polishing operation to facilitate separation of said oil from said cream by said polishing operation and thereby improve the recovery of said oil from said cream in said polishing operation.

2. The process of claim 1 wherein the viscosity of the cream prior to thinning is at least 500 centipoise.

3. The process of claim 1 wherein the viscosity of the cream after thinning is about 100 centipoise.

4. The process of claim 1 wherein the thinning is carried out by mechanical agitation.

5. The process of claim 1 wherein the thinning is carried out in a blender.

6. The process of claim 1 wherein the thinning is carried out by forcing the cream through a restrictor valve.

7. The process of claim 6 in which a pressure of 400 to 700 p.s.i. is maintained across the restrictor valve.

8. The process of claim 1 wherein the citrus oil is selected from the group consisting of lemon, lime, orange, grapefruit and tangerine.

9. The process of claim 1 wherein peel oil is added to said cream emulsion prior to said mechanical thinning to produce an oil-in-water emulsion dispersed in oil.

10. The process of claim 1 wherein the water is maintained at a temperature from about ambient up to about 180° F.

11. The process of claim 1 wherein the water is maintained at a temperature from about 120° F. to about 150° F.

References Cited

UNITED STATES PATENTS

| | | | |
|---|---|---|---|
| 2,296,004 | 9/1942 | Platt | 260—236.6 |
| 2,698,303 | 12/1954 | Blair, Jr. et al. | 252—349 |
| 2,776,278 | 1/1957 | Birds | 260—236.6 |

LEWIS GOTTS, Primary Examiner

E. G. LOVE, Assistant Examiner

U.S. Cl. X.R.

260—412